United States Patent [19]

McArthur

[11] 4,286,578

[45] Sep. 1, 1981

[54] SOLAR ENERGY ABSORBING PANEL

[76] Inventor: William H. McArthur, P.O. Box 236, Forest City, N.C. 28043

[21] Appl. No.: 78,227

[22] Filed: Sep. 24, 1979

Related U.S. Application Data

[62] Division of Ser. No. 827,948, Aug. 26, 1977, Pat. No. 4,184,476.

[51] Int. Cl.³ ............................................... F24J 3/02
[52] U.S. Cl. .................................... 126/429; 126/447; 126/449; 126/450
[58] Field of Search .............. 126/417, 429, 431, 441, 126/444, 445, 446, 447, 448, 449, 450, 901

[56] References Cited

U.S. PATENT DOCUMENTS

| 246,626 | 9/1881 | Morse | 126/429 |
|---|---|---|---|
| 2,693,939 | 11/1954 | Marchant et al. | 126/429 |
| 2,931,578 | 4/1960 | Thompson | 126/429 |
| 3,089,670 | 5/1963 | Johnson | 126/449 |
| 3,863,621 | 2/1975 | Schoenfelder | 126/429 |
| 4,016,861 | 4/1977 | Taylor | 126/446 |
| 4,019,494 | 4/1977 | Safdari | 126/449 |
| 4,019,496 | 4/1977 | Cummings | 126/449 |
| 4,074,706 | 2/1978 | Hadju et al. | 126/447 |
| 4,083,360 | 4/1978 | Couruoisier et al. | 126/450 |
| 4,088,117 | 5/1978 | Keyes | 126/449 |
| 4,088,266 | 5/1978 | Keyes | 126/449 |
| 4,120,283 | 10/1978 | Eder | 126/449 |
| 4,126,014 | 11/1978 | Kay | 126/449 |
| 4,150,661 | 4/1979 | Callegari et al. | 126/445 |
| 4,178,912 | 12/1979 | Felter | 126/449 |
| 4,186,722 | 2/1980 | Muessig | 126/450 |

*Primary Examiner*—Daniel J. O'Connor
*Attorney, Agent, or Firm*—Bell, Seltzer, Park & Gibson

[57] ABSTRACT

A solar energy absorbing panel is provided which may be integrally incorporated into a conventional building structure so that it does not protrude from the normal contour of the building, and which utilizes components of the building structure as a part of the collecting apparatus to thereby minimize the cost thereof. The panel is composed of a plurality of interconnected side-by-side, generally U-shaped sections, with the adjacent sides of adjacent sections forming parallel fins which facilitate transfer of heat to air passed therealong. Also, slot means are provided at one end edge of the panel which is adapted to receive the other end edge of another like panel therein, whereby the panels may be joined in an end-to-end arrangement.

7 Claims, 12 Drawing Figures

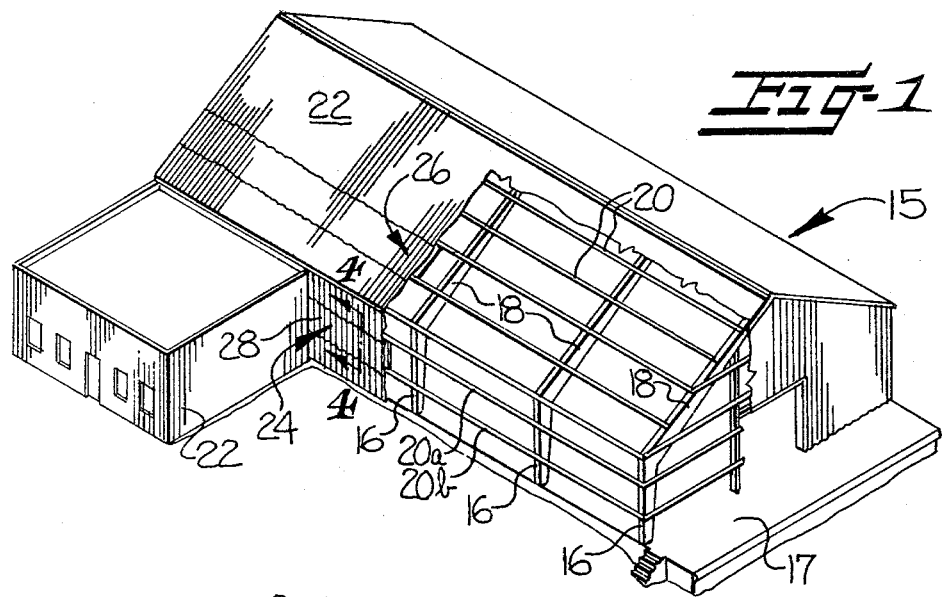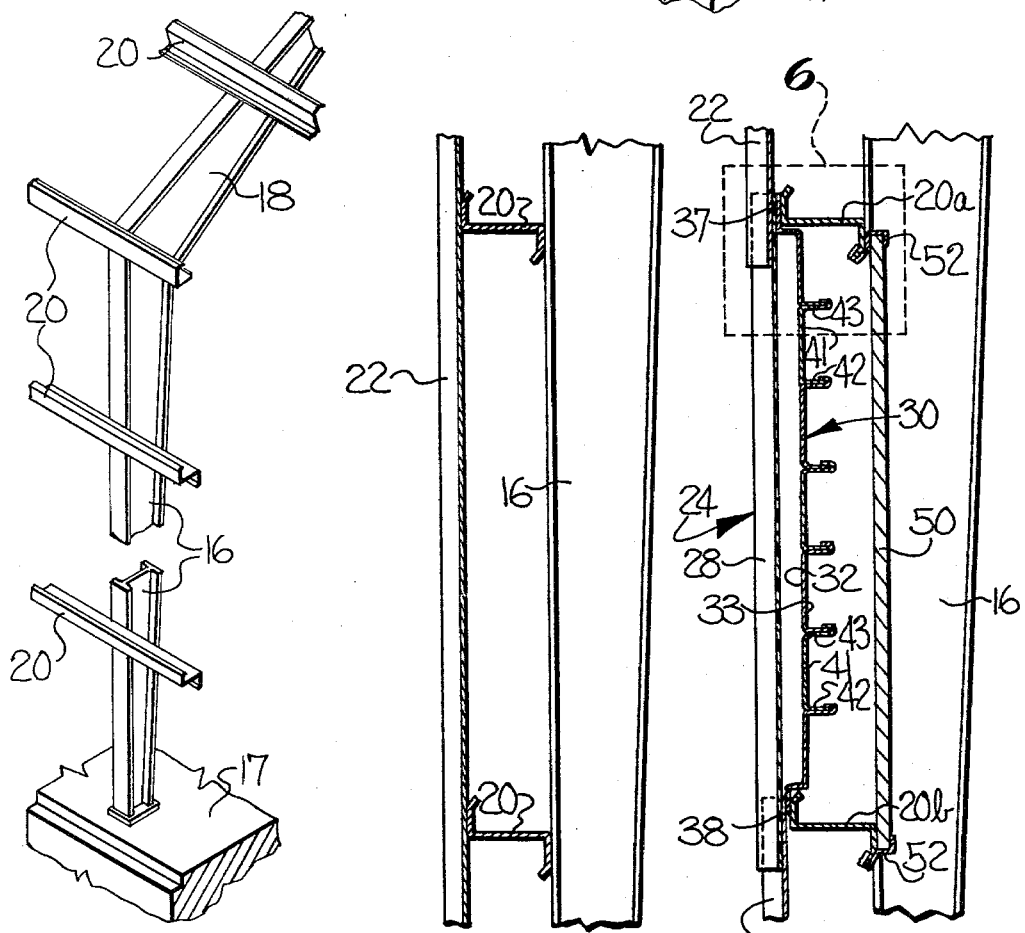

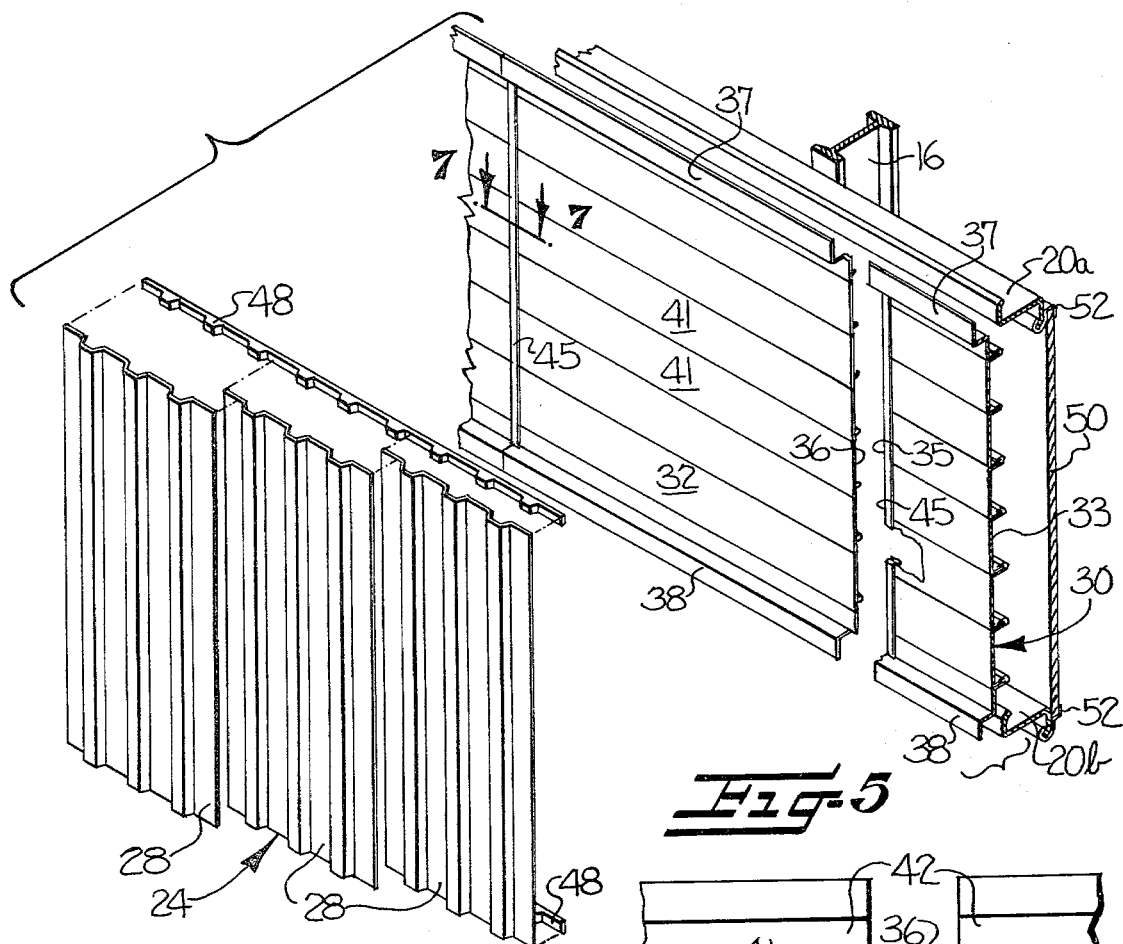
Fig-5
Fig-7
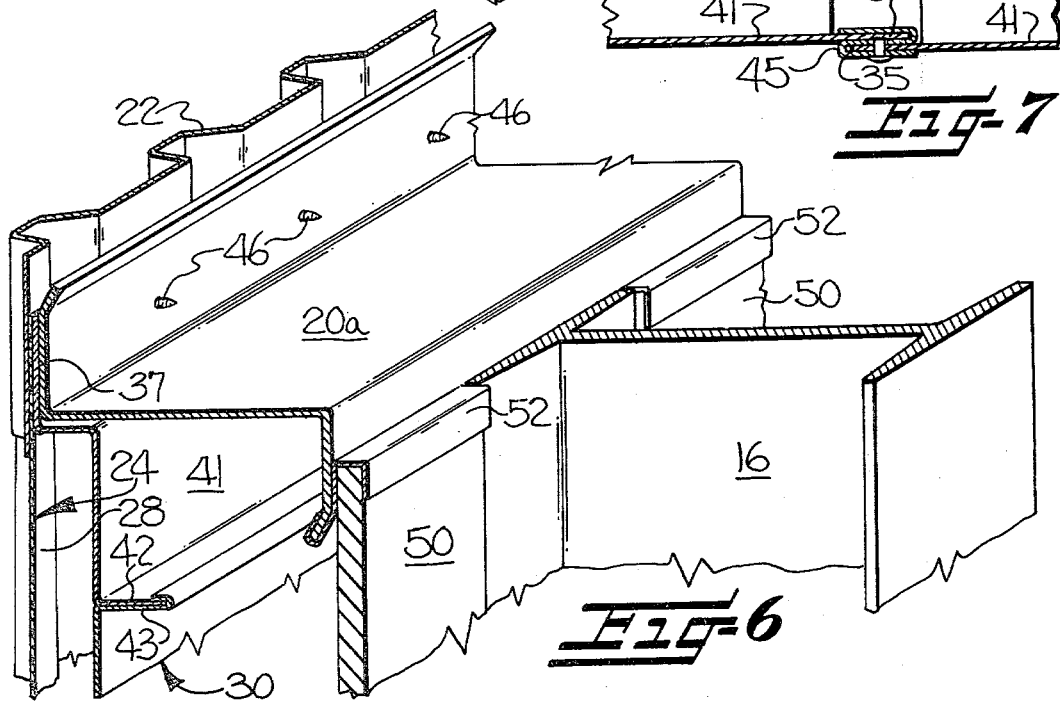
Fig-6

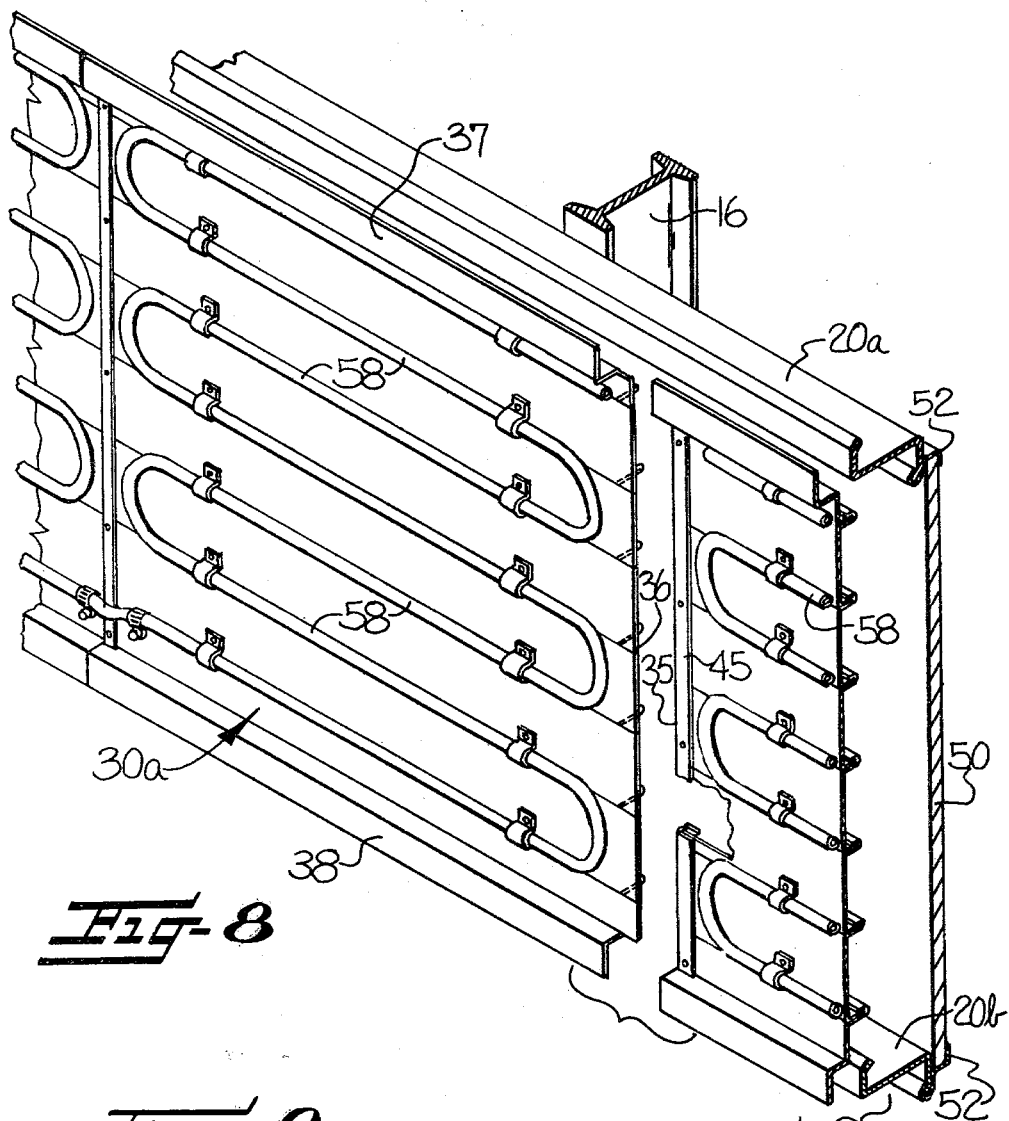
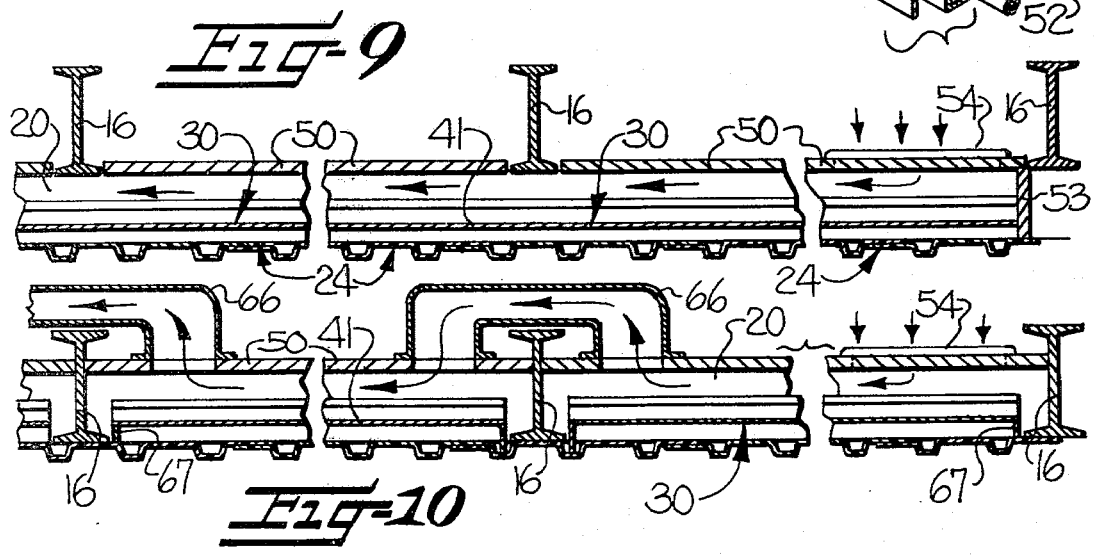

SOLAR ENERGY ABSORBING PANEL

This is a division of Application Ser. No. 827,948, filed Aug. 26, 1977, now U.S. Pat. No. 4,184,476.

The present invention relates to a solar energy absorptive panel for use in a solar energy collector.

In recent years, solar heating systems for collecting, storing and distributing the sun's heat energy to the interior of a building have been the subject of considerable developmental activity. Typically, known systems include solar collectors in the form of large rectangular frames which are placed directly on a roof or wall of the building, and which comprise a sheet metal solar energy absorber, a covering sheet of glass or plastic which is transparent to solar radiation, and an insulating material behind the absorber. In an air type collector, air is adapted to be passed along the absorber so as to absorb heat therefrom, and the heated air is then ducted directly into the interior of the building or to a heat storage unit. In a liquid type collector, water or similar liquid is passed through channels attached to the absorber, and then is piped to a heat transfer unit or storage unit.

The above described conventional solar collectors possess several disadvantages which have hindered wide-spread acceptance and use. Among these disadvantages is the high initial cost of the collectors, and the fact that expensive changes are often required in the building structure to accommodate the collectors. Also, the collectors protrude from the normal exterior of the building, and are often unsightly. Still further, the solar energy absorptive panels presently utilized in such collectors are relatively expensive, they cannot readily be formed into a collector surface of considerable length, and they are difficult to store or ship in view of their large size.

It is accordingly an object of the present invention to provide a low cost solar energy absorptive panel which overcomes the above disadvantages.

It is a more particular object of the present invention to provide a solar energy absorptive panel which may be readily fabricated to a desired width, and which may be interconnected to like panels to form a continuous collector surface of considerable length.

It is a further object of the present invention to provide a solar energy absorptive panel for a collecting apparatus which may be built into the roof or exterior wall of a standard building, such as a conventional prefabricated metal building, and without changing the normal contour of the exterior of the building.

It is also an object of the present invention to provide a solar energy absorptive panel for a collecting apparatus which utilizes certain of the structural components of a conventional building as part of the solar collector, to thereby minimize the cost of the collector.

These and other objects and advantages of the present invention are achieved in the embodiments illustrated herein by the provision of a solar energy absorptive panel which comprises a sheet of metallic material having a dark coating overlying the outer surface thereof, and a plurality of parallel fins integrally formed from the material of the sheet and extending outwardly from the opposite surface thereof. The panel is composed of a plurality of interconnected side-by-side U-shaped sections, with the adjacent sides of the adjacent U-shaped sections forming the fins. Slot means in the form of an S-shaped clip is mounted along one end edge of each panel for receiving the other end edge of another like panel therein, whereby a number of the panels may be readily joined in an end-to-end arrangement.

The panel of the present invention is typically utilized in a solar collector which is integrally incorporated in a building wall structure, and which comprises a plurality of parallel, spaced apart structural support members, transparent exterior panel means mounted to the outside edges of two adjacent support members, and with the solar energy absorptive panel mounted between the two adjacent support members and underlying the transparent panel means. Means are provided for conveying a fluid along the solar energy absorptive panel whereby the solar energy is collected by the absorptive panel and transferred to the fluid. Additional exterior panel means are mounted to the outside edges of the remaining support members, such that the transparent panel means and additional panel means are substantially co-planar and collectively define the exterior surface of the wall structure. Further, interior panel means are mounted to the inside edges of the two structural support members, such that the solar energy absorbing panel, two support members, and interior panel means collectively define an air passageway through which air is circulated, with the finned surface of the solar energy absorbing panel extending into the passageway to facilitate heat transfer to the circulating air.

Some of the objects of the invention having been stated, other objects will appear as the description proceeds when taken in connection with the accompanying drawings, in which FIG. 1 is a perspective view, partly broken away, of a building structure embodying the present invention;

FIG. 2 is a fragmentary perspective view of a portion of the structural frame of a conventional building structure of the type illustrated in FIG. 1;

FIG. 3 is a fragmentary sectional elevation view of a portion of the structural frame illustrated in FIG. 2, and further illustrating the exterior panels;

FIG. 4 is a fragmentary sectional elevation view of the building structure illustrated in FIG. 1 and taken substantially along the line 4—4, and illustrating the solar energy collection apparatus of the present invention positioned in the exterior wall thereof;

FIG. 5 is a fragmentary exploded perspective view of the solar energy collection apparatus shown in FIG. 4;

FIG. 6 is a fragmentary perspective view of the portion of the solar energy collecting apparatus indicated at 6 in FIG. 4;

FIG. 7 is a fragmentary sectional plan view illustrating the structure by which the panels are interconnected, and taken substantially along the line 7—7 of FIG. 5;

FIG. 8 is a fragmentary exploded perspective view of another embodiment of a solar energy collecting apparatus in accordance with the present invention;

FIG. 9 is a fragmentary sectional plan view illustrating the solar energy collecting apparatus of FIGS. 1 and 4–6;

FIG. 10 is a view similar to FIG. 9 but illustrating another embodiment of the present invention and wherein the horizontal support members or purlins of the building structure are disposed flush with the exterior of the structural beams;

Figure 11:
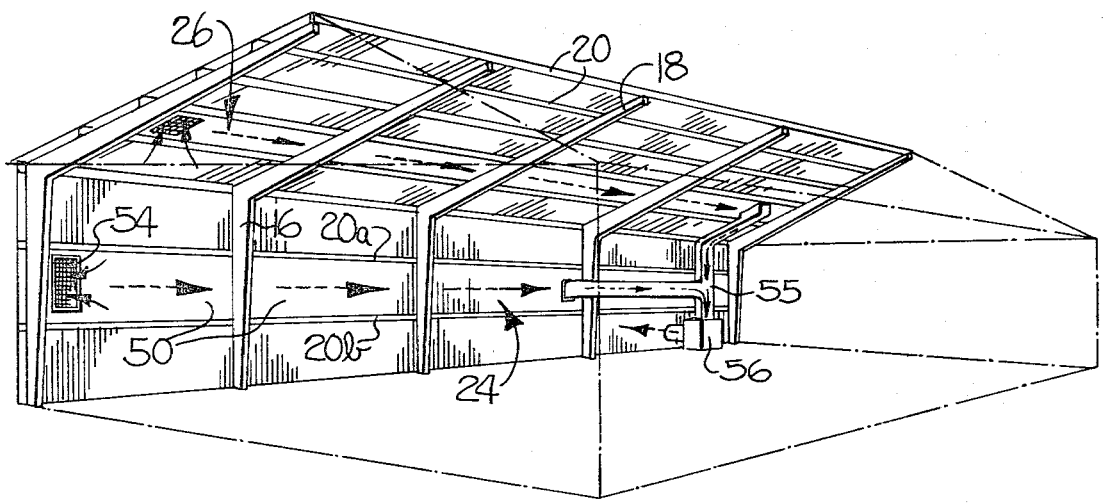
FIG. 11 is a fragmentary perspective view of the interior of the building illustrated in FIG. 1.

Referring more specifically to the drawings, FIG. 1 illustrates a building 15 which incorporates the solar energy collecting apparatus of the present invention. Certain structural components of the building are essentially conventional, and as indicated in FIGS. 2 and 3, the conventional structural components include a plurality of spaced apart vertical structural beams or columns 16 mounted on a foundation 17 and defining the exterior periphery of the building. In addition, a number of inclined structural beams or rafters 18 are supported by the columns 16 and define the roof of the building, and a plurality of horizontal, spaced apart support members or purlins 20 are attached to and extend perpendicularly between the structural beams along the walls as well as the roof of the building.

The purlins 20 are essentially Z-shaped in cross-sectional configuration and are attached to the outside edges of the columns 16 and rafters 18. A plurality of rectangular exterior panels 22 are mounted in an overlapping, side-by-side arrangement to the outside edges of the purlins to form the exterior surface of the side walls and roof. Typically, the columns 16 are spaced apart about 20 to 25 feet, and the purlins 20 are spaced about 5 feet from each other. The exterior panels 22 typically measure about 3 by 11 feet, and are fabricated from a metallic or opaque plastic sheet material having a corrugated cross-sectional configuration to improve the rigidity thereof.

In accordance with the embodiment of the present invention as illustrated in FIG. 1, the wall and roof of the building 15 which face in a southerly direction each integrally incorporate a solar energy collector 24 and 26 respectively, with the collectors being characterized by the absence of components which protrude outwardly beyond the contour of the building structure. While the wall collector 24 is described in detail herein, it will be appreciated that the roof collector 26 is of similar construction.

Figure 12:
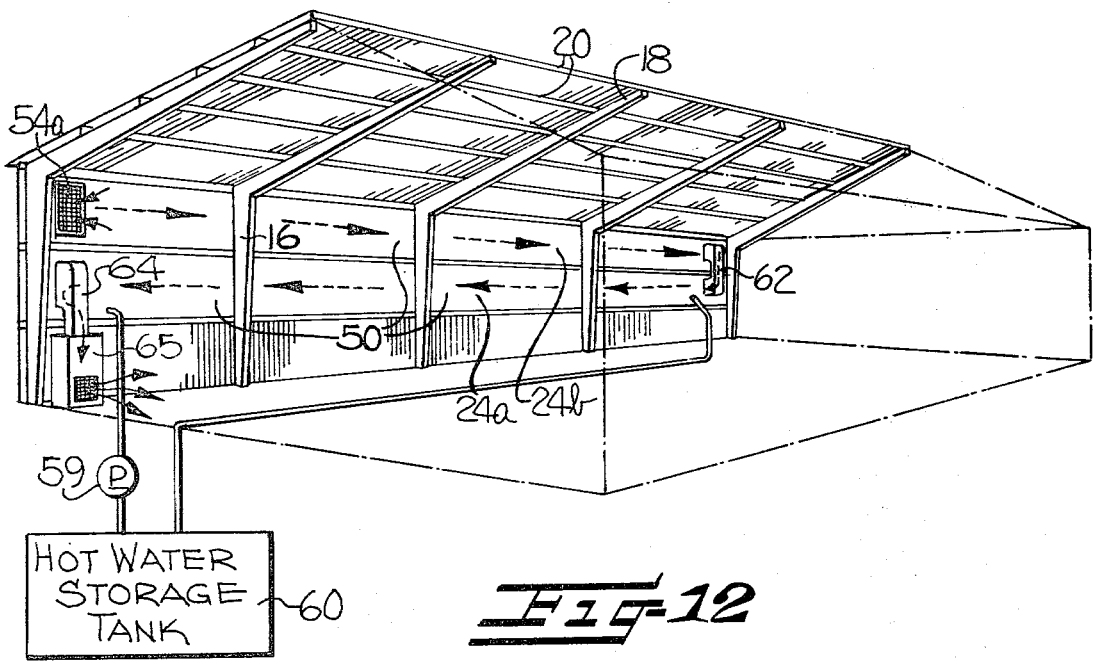
FIG. 12 is a view similar to FIG. 11 but illustrating another embodiment of the present invention and wherein the vertical exterior wall incorporates two parallel solar energy collectors therein.

The wall collector 24 includes a plurality of exterior panels 28 formed of a material transparent to solar radiation and mounted to the outside edges of two adjacent purlins 20a and 20b. The transparent exterior panels 28 are mounted in an overlapping side-by-side arrangement along the length of the purlins, and they are preferably similar in cross-sectional configuration to the remaining exterior panels 22, such that the transparent panels 28 and remaining panels 22 are substantially coplanar and collectively define the exterior surface of the wall. Stated in other words, the transparent exterior panels 28 match the general appearance of the remaining panels 22 (with the exception of being transparent), and thus they do not change the normal contour of the exterior of the building 15. As a particular example, the transparent panels 28 may comprise a conventional plastic skylight panel, having a width of about 3 feet and a length of about 5½ feet so as to extend between the purlins 20 and leaving a few inches to overlap the panel 22 positioned below, note FIG. 4. Where side-by-side collectors are employed as illustrated in FIG. 12, the panels 28 preferably are the normal 11 feet in length so as to extend across both collectors.

The collector 24 further comprises solar energy absorptive panel means mounted to extend between the two adjacent purlins 20a and 20b and underlying substantially the full area of the transparent exterior panels 28. More particularly, the solar energy absorptive panel means comprises a plurality of individual, generally rectangular panels 30 of a heat conducting material, such as 0.019 gauge diamond embossed aluminum sheeting. Each panel 30 defines a generally planar outer surface 32 facing the transparent exterior panel, an opposite surface 33, and opposite end edges 35, 36, and opposite side edges 37, 38. The outer surface 32 is coated with a dark, energy absorbing surface, such as black paint. In addition, each panel 30 is composed of a plurality of sections which extend between the end edges, with each section having a planar medial portion 41 and opposite sides 42, 43. The adjacent sides 42, 43 of adjacent sections extend substantially perpendicularly from the planar medial portion and are contiguous to each other, to thereby form a plurality of fins extending outwardly from the opposite surface 33 of the sheet and continuously between the opposite end edges 35, 36. Also, the side 43 includes a reversely curved lip which overlaps the extremity of side 42 to effectively interconnect the two sides. Typically, the fins are equally spaced apart a distance of about 8 inches, and they are about 2 inches in height. As will be apparent, the segmental construction of the panel permits it to be readily sized to almost any desired width by the addition of additional segments.

Each panel 30 further includes slot means along the end edge 35 for receiving the other end edge 36 of another like panel therein, whereby a number of panels may be readily joined in an end-to-end arrangement and with the fins extending in a common direction. As best seen in FIG. 7, this slot means preferably comprises a clip 45 having an S-shaped cross-sectional configuration, with the clip being fixedly mounted along the end edge 35 of the panel by a rivet or the like. If desired, the fins of one panel may be laterally offset from the fins of the adjacent panels to facilitate heat transfer to the adjacent airstream as further described below.

The side edges 37, 38 of the panels 30 are offset in a common direction a distance of about one inch, such that the offset side edge portions are coplanar with respect to each other and parallel to the plane of the outer surface 32. These offset side edge portions are adapted to be positioned upon the outside edges of the purlins 20a, and 20b and thus underlie the overlapping exterior panels 22 and 28 (note FIG. 6), and serve to provide an insulating air space between the exterior panels 28 and solar energy absorbing panels 30. The overlapping exterior panels 22 and 28 and panels 30 are attached to the purlins 20a, 20b by means of selfthreading screws 46 or the like, note FIG. 6. In this regard, a side edge seal in the form of an elongate foam strip 48 having a configuration corresponding to that of the exterior panel may be positioned intermediate the external panels 28 and offset side edges 37, 38 of the panels 30 to prevent passage of air therebetween and thus form a closed insulating airspace between the panels 28 and 30, note FIG. 5.

The wall collector 24 further includes interior panel means mounted to the inside edges of the two purlins 20a, 20b. This interior panel means is transversely aligned with the exterior panels 28, and comprises a plurality of individual, side-by-side panels 50 formed of a rigid fiberglass ductboard or similar material. The panels 50 may be attached by means of clips 52 which extend along the inside edges of the purlins 20a, 20b, or by some other suitable means.

From the above description, it will be seen that the solar energy absorbing panels 30, two purlins 20a, 20b, and interior panels 50 collectively define an enclosed air passageway which extends along the length of the wall. As best seen in FIG. 9, the interior panels 50 terminate at the columns 16, and such that the outside faces of the columns form a portion of the passageway. In addition, a suitable partition 53 is mounted between the purlins to close the ends of the passageway, as well as preclude the entry of air between the exterior panels 28 and energy absorbing panels 30. By this arrangement, the passageway is able to continue uninterrupted along the entire length of the wall structure. Also, the fact that the purlins which form the side edge of the pasageway are part of the conventional building structure, results in the cost of the collector being minimized.

Means are provided for conveying air through the above described passageway, and as seen in FIG. 11, this conveying means comprises an inlet grill 54 at one end of the passageway and an air duct 55 and blower 56 at the opposite end of the passageway. As illustrated, the air duct and blower also communicate with the passageway of the roof collector 26. Also, it will be apparent that the extent to which the side edges 37 and 38 of the panels 30 are offset determines the volume of the passageway, and thus the offset may be designed to provide the desired velocity of the air in the passageway for a given blower system.

In operation, solar energy passes through the transparent exterior panels 28 of the two collectors 24, 26, and warms the solar energy absorbing panels 30, and the air passing along the passageways contacts the finned surfaces 33 of the panels and absorbs heat therefrom. The heated air may then be conveyed to a desired area of the building for heating purposes, or any other desired use.

FIGS. 8 and 12 illustrate a modified embodiment of the present invention wherein heat may be recovered from the solar energy absorptive panels 30a by means of a tubular conduit 58, such as copper tubing, mounted in heat transfer relationship to the outside surface of the energy absorptive panels 30a. Water may be conveyed through the tubular conduit by means of a pump 59, and the heated water conveyed to a hot water storage tank 60 or the like, note FIG. 12. Suitable controls (not shown) may also be provided whereby either air flow through the passageway, or water flow through the conduit 58 may be used to remove and recover the heat absorbed, or both systems may be operated concurrently.

FIG. 12 illustrates a further embodiment of the invention wherein collectors 24a, 24b substantially as described above are provided between each of two vertically adjacent pairs of purlins. A transfer duct 62 is positioned between the collectors at one end thereof, whereby the air enters one collector through a grill 54a and passes through both collectors 24a and 24b before being withdrawn through the outlet duct 64 by blower 65.

In certain conventional building structures of the described type, the purlins are positioned within the outline of the structural columns 16 and so as to be flush with the outside edges thereof. This construction is illustrated in FIG. 10. The present invention may be readily employed for use with such buildings by the use of transfer ducts 66 extending around the columns to thereby form a continuous air passageway along the full length of the wall or roof. Also, the panels 30 are constructed so as to terminate adjacent the columns, and a closure partition 67 may be positioned along the end edges of the panels to prevent air from entering the insulating airspace between the panels 30 and exterior panels 28.

In the drawings and specification, there has been set forth a preferred embodiment of the invention, and although specific terms are employed, they are used in a generic and descriptive sense only and not for purposes of limitation.

That which is claimed is:

1. A panel adapted for absorbing solar radiation in a solar energy collector or the like and efficiently transferring the absorbed heat energy to an airstream moving thereover, and comprising a generally rectangular sheet of heat conducting material and having a generally planar first surface and an opposite surface, and opposite end edges and opposite side edges, said sheet being composed of a plurality of interconnected side by side sections, with each section extending between said end edges and including a planar medial portion and opposite sides, and with the adjacent sides of adjacent sections extending substantially perpendicularly from said planar medial portion and being contiguous and interconnected to each other to form parallel fins extending outwardly from the opposite surface of the sheet and between said opposite end edges, the outer sides of those sections adjacent each of the opposite side edges of the panel being offset in a common direction, and such that said offset sides are co-planar with each other and parallel to the plane of said first surface, and said panel further comprising slot means mounted along one of said end edges for receiving the other end edge of another like panel therein and such that a plurality of panels may be readily joined in an end-to-end arrangement and with said fins extending in a common direction, whereby the panel is adapted to transfer heat to air passing along said opposite surface in a direction parallel to said fins, and the panel may be readily fabricated from standard sized sections into a desired width.

2. The panel as defined in claim 1 further comprising a dark coating overlying said first surface to facilitate the absorption of solar radiation thereby.

3. The panel as defined in claim 2 wherein one of each of said contiguous sides of adjacent sections includes a reversely curved lip which overlaps the other of said contiguous sides to effectively interconnect the same.

4. The panel as defined in any one of claims 1-3 wherein said slot means comprises a clip having an S-shaped cross-sectional configuration, said clip being fixedly mounted along said one end edge of said panel.

5. The panel as defined in claim 1 further comprising fluid conduit means attached in a heat conductive relationship to said sheet, whereby the panel may be selectively used to transfer heat to air passing along said opposite surface in a direction parallel to said fins, or to a fluid passing through said conduit means.

6. The panel as defined in claim 5 wherein said fluid conduit means overlies said first surface.

7. The panel as defined in claim 1 wherein the panel is formed of a metallic heat conducting material and further has a dark coating overlying said first surface thereof.

* * * * *